April 20, 1965 J. RABINOW 3,179,922
NORMALIZING READING MACHINE
Filed April 19, 1962 2 Sheets-Sheet 1

INVENTOR
Jacob Rabinow
BY Joseph A. Genovese & Max L. Libman
ATTORNEYS

INVENTOR
Jacob Rabinow
BY Joseph A. Genovese & Max L. Libman
ATTORNEYS

United States Patent Office 3,179,922

Patented Apr. 20, 1965

3,179,922

NORMALIZING READING MACHINE

Jacob Rabinow, Takoma Park, Md., assignor, by mesne assignments, to Control Data Corporation, Minneapolis, Minn., a corporation of Minnesota Filed Apr. 19, 1962, Ser. No. 188,736
12 Claims. (Cl. 340—146.3)

Figure 1:
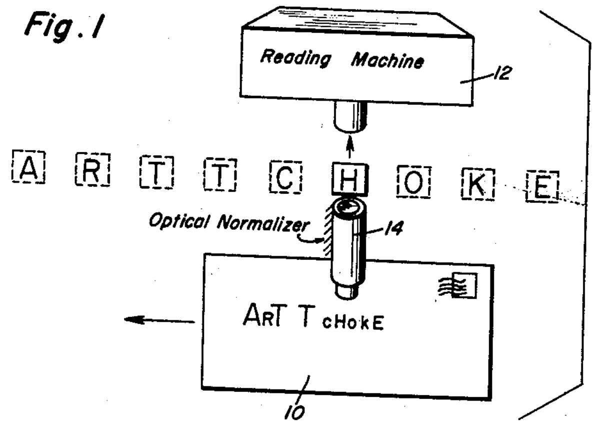

This invention relates to reading machines and particularly to a device to normalize the size of character images which are examined by the reading machine.

As the word "character" is used herein, it is defined as any letter, number, symbol, pattern, shape, etc. or portion thereof capable of being identified by machine.

All character reading machines, of which I am aware, have a set of stored criteria against which information gathered from the image of an unknown character is compared. The nature of the stored criteria varies considerably with the different types of reading machines. For example, the criteria may be stored in a mask as in the Rabinow Patent No. 2,933,246; by the arrangement of magnetic cores or resistor correlation matrices as in the Rabinow et al. Patent No. 3,104,369; or by other means, This type of reading machine identifies characters by comparing information derived from the image of an unknown character with the stored criteria. Unfortunately, the machines will tolerate only a small amount of size-difference between the images of the unknown characters and the size of images for which the masks, the storage matrices, etc. are designed. This is more readily apparent in the mask type machine, when the image of the unknown character is larger or smaller than the corresponding window for that character in the mask.

There are reading machines which function on slightly different principles. For example, feature and stroke analysis machines recognize characters by the arrangement of features, lines, curves, etc. This type of machine is also sensitive to size-change or other font-differences. Curve tracing machines are not as sensitive to font-differences but they have other inherent difficulties. For example, a break in a line of a character is usually quite serious in a curve tracing machine, and not serious in other kinds of machines.

There are several things that can be done to overcome the problem of character size. One is to design a reading machine to recognize characters of a single font, and limit the user to that font. In some instances this is a satisfactory solution. However, this means that vast quantities of printed material already in existence cannot be read by machine. The next obvious alternative is to design a reading machine so that it will recognize many fonts, at least enough to cover the majority of print. A machine of this type is very complicated (relying on present technology), and is not as reliable as a machine designed to recognize a specific font. The reason for this is that an alpha-numeric machine for a single font must compare an unknown character to at least 40 references. If the number of fonts to be read is increased to, say, ten, the unknown character would then have to be distinguished from some 400 others. Consequently, the average difference between characters will be smaller. The third possibility, and the one with which my invention is concerned, is to normalize the images of the characters which are examined by the examination device of the reading machine. Accordingly, even though characters may be of different sizes when they are printed, they will appear of a certain predetermined size to the reading machine.

Size-normalizing can be achieved in several ways. It has been proposed to image each character on a cathode ray tube and electronically normalize the character. This system has several disadvantages. First of all, an expensive cathode ray tube is generally used; and the persistence of the tube screen must be quite low to allow characters to be displayed and decayed quickly. Even with very favorable phosphor, the system is slow. The available light at the face of a tube is small.

An object of my invention is to provide an optical normalizer to change (where necessary) the size of the image of an unknown character thereby enabling an otherwise conventional reading machine to recognize characters of various different fonts where the font-difference is a matter of character-size.

Another object of my invention is to provide an optical normalizer which either enlarges or reduces image size to predetermined dimensions for the reasons mentioned above.

Another object of my invention is to provide a character normalizer which is simple, and which may be used with reading machines of most types of which I am aware with equally good results. This provides a very important advantage over other normalizing systems, whereby the usefulness of reading machines of my design or the designs of others may be greatly increased.

The preceding objectives can be fulfilled in several ways. One is by projecting an image of an unknown character onto a photosensitive device having a circuit capable of measuring the size of the image. I have arranged my circuit in such a way that the output signal corresponds to the actual size of the image. This signal is fed to another circuit which has the effect of providing new signals to either enlarge or reduce the size of the image to bring it to the desired size. The simplest method of demonstrating this is to use an automatically focusing optical device to form the image, for example a photographic auto-focusing enlarger lens system, or a "zoom" lens system such as used in television cameras, some motion picture cameras, etc. The image size-detector can be a part of the reading machine examination device or can be a "pre-scanner."

In measuring the size of a character image, I can measure one or more of its dimensions. But, I have elected to show a height detector as a preferred measurement device, and this leads to some difficulty. The "period" punctuation mark and hyphen should not ordinarily be normalized to the same size as the other characters of an alpha numeric system. The height measurement of the period and hyphen would always require enlargement to normalized size. The same difficulty would be encountered if I used a width detector, because I would have the comma, colon and semi-colon to contend with, and maybe other characters. However, these problems are not acute because the punctuation marks can be identified in their enlarged form. Alternatively, I can use mechanical stops to limit the travel of possible adjustment of the optical normalizer so that the characters and especially the punctuation marks cannot be enlarged above a given magnification.

A few of the more common reading uses where my optical normalizer can be used are as follows:

(a) Where it is advantageous to normalize the image of each character. An example is reading the addresses on postal material (letters or packages). There are only a few characters in each address, and the fonts on successive letters (or packages) are completely random (in the absence of a pre-sort step). Another example is printed slips from many printers, where the slips each may contain only a few characters.

(b) Where it is unnecessary to normalize the image of each character but where it is desired to normalize a whole set of characters. For instance, some printed documents have characters which are all the same size and the only problem is that the reading machine is designed to recognize characters of a different size (font). Adding machines, bookkeeping machines, and documents printed in all capital letters are examples. For these, it is more efficient to use my normalizer in the following way: examine a sample, e.g., a character, few characters, a line or a few lines, and normalize to the size of the sample. Then manually or automatically lock-in the normalizer and bypass the electronic controls thereof for subsequent reading.

(*c*) Where there is a choice to either normalize the image of each character, or to use the sampling method discussed above or variations thereof. If the documents have intermixed upper and lower case characters, such as on this page, my normalizer can be used to normalize the image of each character. Obviously, the smaller characters (e.g., *o, e, c, a*) will be enlarged to the same height as the larger characters (the capital letters, lower case *l, k, p, d,* etc.). But this will present no problem to the machine, because the recognition criteria (mask, matrices, etc.) can certainly be designed to recognize the slightly larger images of the smaller characters even though we are accustomed to seeing them smaller. On the other hand, a sample of intermixed characters can be examined, and the normalizer adjusted for the larger characters and locked in after sampling. Then the criteria for the smaller characters would be designed for the correspondingly smaller images. The final choice is to examine a sample and adjust the normalizer for the average character-size and rely on the tolerances of the machine in recognizing the characters.

Another object of my invention is to provide an image forming device to form an image of a character on a height detector which is either part of the examination device of a reading machine or which is separate; and to normalize that image to a predetermined size as required by the results obtained from the size detector.

The illustrated forms of my invention are given by way of example only. Further, I have discussed size normalizing and have not indicated any dimensional changes along different axes of the character images. To disclose the principle of the invention I have elected to illustrate a "zoom" lens system with ordinary spherical lenses so that for example, a reduction of an image will be in all directions proportionately. However, in addition or in place of the conventional "zoom" lens system I can use a cylindrical lens element which affects image size along one axis only. I may use various lens combinations to fulfill specific objectives.

In the drawings:

FIGURE 1 is a diagrammatic view showing characters printed on an envelope, prior to normalizing and character recognition by a reading machine.

Figure 1A:
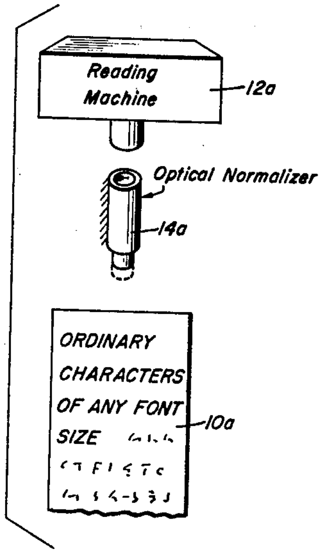

FIGURE 1*a* is a diagrammatic view showing a use of my invention where the normalizer may be active just for the first character or the first few characters after which it will automatically become inactive because all other characters are of the same font.

Figure 2:
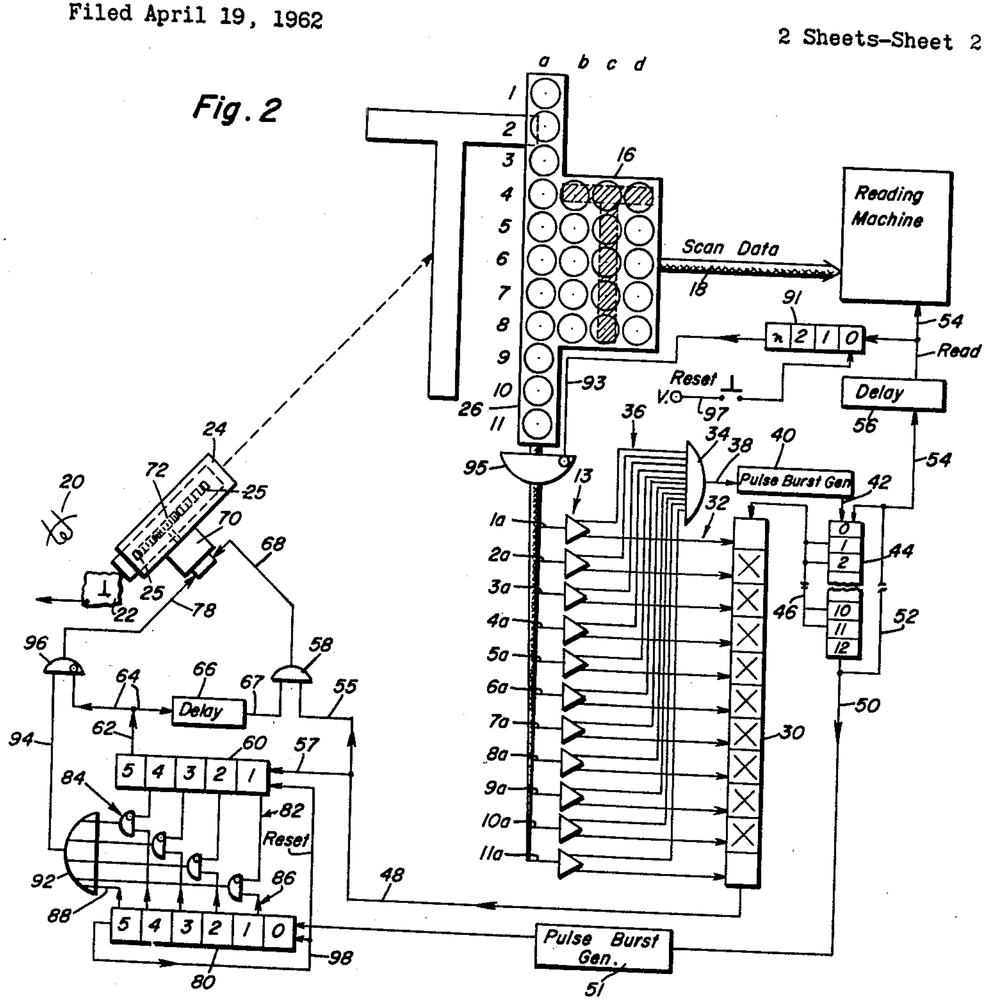

FIGURE 2 is a view diagrammatically showing my invention applied to a reading machine.

Figure 2A:
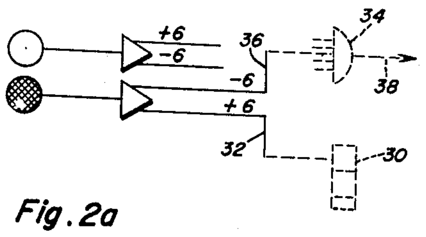

FIGURE 2*a* is a diagrammatic view to explain the operation of a portion of the circuits of FIGURE 2.

Figure 3:
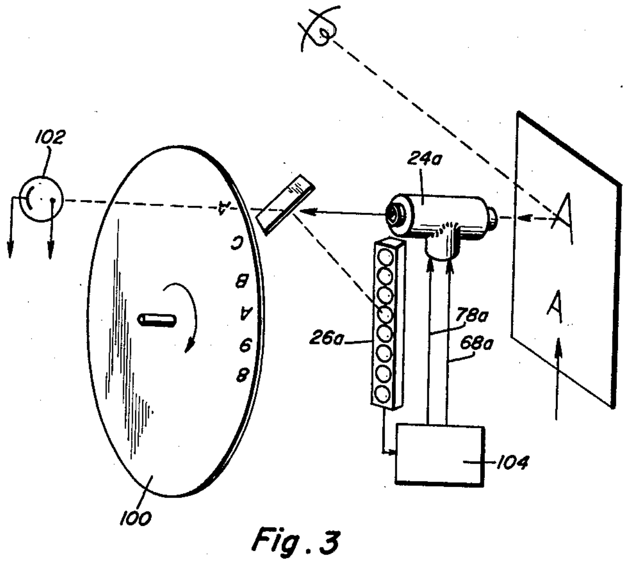

FIGURE 3 is a diagrammatic view showing my invention used with a reading machine which is different from the reading machine in FIGURE 2.

*Summary*

As I have described before, most types of reading machines must be designed for one or a few fonts, otherwise the reading machine becomes prohibitively expensive or so complex that its reliability is reduced. There are exceptions to this, for example curve tracing machines, but these have other problems. My invention normalizes the images of the characters as to size. Consequently, to the reading machine, characters of different sizes appear as one uniform size. The result is that a reading machine designed for a given size character is made capable of identifying characters printed in different sizes, and this beneficial result is obtained with a minimum of equipment. If desired, my invention can be applied as an attachment to existing reading machines with very little or no alteration of the reading machine circuits.

The following description of a specific form of my invention and several applications thereof, is concerned with normalizing the size of characters by detecting the height thereof. However, it is emphasized that normalizing by height-measurement is given by way of example only. I can just as easily normalize by taking into consideration both height and width or either. Furthermore, it will be seen later that my size-normalizing is accomplished by either enlarging or reducing the image size of an unknown character, but I can, if I wish, normalize the width only, or the height only, and in predetermined proportions.

The principle of operation of my invention is to examine the image of an unknown character and note its size. If the character is too small or too large my invention enlarges or reduces the image to normalize the same. Since image-normalizing takes place either ahead of or during examination by the reading machine examination device (usually a scanner) the reading machine has no way of "knowing" that the image presented to it is the image of a small, large, or design-size character.

*Size-Normalizing Apparatus*

FIGURES 1 and 1*a* are pictorial views showing only two of many possible uses of my apparatus. Document 10 in FIGURE 1 is a piece of ordinary mail. Machine-reading of addresses is complicated due to the lack of control over the type and style of printer used in addressing letters, packages, etc. This is an excellent field for my invention because of the complete lack of control over printing.

Thus, FIGURE 1 shows document 10 being moved horizontally while it is examined by the examination device of a conventional reading machine 12. My optical normalizer 14 is between the print on document 10 and the reading machine examination device. The line of print on the document includes characters of different sizes, and their images are diagrammatically shown normalized as to size by optical normalizer 14.

FIGURE 1*a* shows document **10*a*, optical normalizer 14*a* and reading machine 12*a* in an alignment similar to FIGURE 1. The only difference between these views is that document 10*a* represents any document other than letter mail. Document 10*a*** could be a page of a book, a printed form, a roll of tape, a credit card, etc. The methods of handling the documents and the nature of the document itself are immaterial to my invention.

In some instances (FIGURE 1) normalizer 14 may remain continually operative, as when there is good chance that successive documents (letters 10) will contain characters of different fonts and there will be only a few characters on each document. In other instances examination of the first few characters of a document or line thereof will be the key to the size of all characters on that document or a run of documents. In that case the normalizer can be adjusted and then locked in the adjusted position. When all characters are of the same size no adjustment of the image size (after the first adjustment) is required.

FIGURE 2 shows a reading machine with its examination device 16 separated therefrom. The examination device is a full-field mosaic scanner made of photocells in columns *b*, *c*, and *d*. For the purpose of my invention it is assumed that the examination device 16 is conventional and provides amplified outputs (on the conductors of cable 18) to the reading machine. As far as my invention is concerned the type of scanning is not critical.

Scanner 16 could be replaced by a vertical row of photocells as in the Rabinow et al. Patent No. 3,104,369; could be a full mosaic, a mask device or assembly as in the Rabinow Patent No. 2,933,246, etc. Regardless of the type of scanner, optical reading machines generally examine the image on an unknown character which is projected onto the face of the scanner by an optical system. Thus, FIGURE 2 shows a source 20 of illumination for a typical character on a document surface 22. In lieu of a fixed or manually adjustable lens system, I use an automatically focusing, adjustable instrument to form an image of the unknown character on the scanner face. A conventional "zoom" lens system is represented at 24. These are reasonably extensively used in television and photography. Accordingly, device 24 can be adjusted to form an image of a selected size of the unknown character. FIGURE 2 shows the character "T" enlarged with greater magnification than tolerable by the size of scanner 16. The image of the same character is shown in dotted lines (on scanner 16) after having been normalized to the correct size by adjustment of the image forming device 24.

When the image is first formed by device 24 it may be either the correct size for scanner 16, too small or too large. In the illustration, the image to the left of FIGURE 2 is too large, and this fact is detected by size detector 26. The size detector is made of a vertical column (*a*) of photocells 1–11 inclusive at the leading edge of examination device 16. However, it is emphasized that the size detector can be a part of device 16 in those instances where the reading machine design will permit this. Moreover, the size detector can be completely separated from the scanner and located in advance thereof such as a "pre-look" or "pre-scan" device. As will be seen later (FIGURE 3) I need not examine the same image as the reading machine scanner. FIGURE 3 shows a semi-transparent mirror to form two images, one to be used for size-detection and the other for character-identity. My Patent No. 2,933,246 shows another way to do this; i.e., a beam splitter forming many images of the unknown character, one of which may be used for size-measurements.

The size detector 26 includes a shift register 30 of eleven stages, there being one stage for each photocell 1–11 inclusive. The purpose of the shift register is to remember the height of the image of an unknown character as it passes horizontally across the face of size detector 26, for instance by horizontal motion of the document containing the character "T" as shown to the left of FIG. 2. Thus, the individual output lines 1*a*–11*a* of the photocells are fed to inverting amplifiers 13, each having two output lines (32 and 36 in FIGURE 2*a*) whose signals are the complement of each other. When one of the photocells detect "white" (the background of the character) the upper line 36 (as shown in FIGURE 2*a*) conducts one signal and the lower line conducts 32 the inverted signal. For simplicity assume that the signals are +6 and −6 volts respectively. When a photocell (also FIGURE 2*a*) detects "black" (a part of the character image) the amplifier output on the upper line will be −6 volts and the amplifier output on the lower line will be +6 volts. Therefore if we connect the lower lines 32 from the individual amplifiers 13 to the respective stages of the shift register 30, those stages whose photocells detect a part of the character image will store a binary one (black) and the other stages will store a binary zero (white). In the example under consideration ("T") stages 2–10 inclusive of shift register 30 will store binary ones because photocells 2*a*–10*a* inclusive will detect a part of the character image as the image sweeps across the face of size detector 26.

It is necessary to know when one character ends and the next begins. Usually, a reading machine relies on the clear white vertical space between adjacent characters for this purpose. Accordingly, we can use a positive AND gate 34 (responds only to positive signals) whose inputs are on lines 36; i.e., the upper wire of each of the photocell amplifiers 13. Thus, when all photocells of detector 26 see "white" AND gate 34 will be satisfied to provide an output signal on line 38 which triggers pulse generator 40 providing a burst of twelve pulses. The output line 42 of generator 40 operates a timing ring counter 44 to develop a group of eleven shift pulses which are conducted on line 46 to the shift-terminal of register 30. In this way the size-information stored in register 30 is shifted out on line 48 to circuits at the lower left of FIGURE 2 which serve as "difference" circuits as will be described later. When ring counter 44 steps to the 12th (final) stage, a signal is conducted on line 50 (described later) and this signal is fed back over line 52 to reset the timing counter 44. Line 54 which is connected to line 52, conducts the signal from line 50 through a delay 56 to the reading machine as the "read now" trigger or alternative (not shown) to be AND or OR gated with the "read" trigger signal of the machine itself. Delay 56 is of a duration sufficient to allow the signal on line 48 to be processed by the "difference" circuits and for the image forming device 24 to respond. In the illustrated example the response of the image forming device is fast enough to reduce the size of the image to fit the examination device 16. If the image of the unknown character were too small, that is, smaller than the predetermined, desired size, device 24 would respond to enlarge the image to the normalized size.

The signal on line 48 (from the last stage of counter 44) will be a time-sequential pulse group of nine pulses because nine of the stages of the shift register have stored binary ones (in the "T" example). This signal is conducted over lines 55 and 57 to gate 58 and also to a filling shift register 60 of five stages. The filling shift register 60 contains five stages only because examination device 16 is five stages tall (contains five vertical photocells), and obviously this number could be increased or reduced depending on the desired resolution of the examination device. The final stage of filling shift register 60 has an output line 62 which is fed back over line 64 through delay 66 to form the other input 67 of coincidence gate 58. Therefore, the first four pulses of the pulse group conducted on line 48 cannot pass gate 58 for lack of coincidence. When the fifth pulse reaches gate 58, stage five of filling shift register 60 is set (stores a binary one), but there is still no coincidence at gate 58 because the output on lines 62, 64, 67 is delayed at 66. It is obvious now, that the final four pulses of the pulse group conducted on line 48 will pass gate 58 because the input on line 67 is a standing signal satisfying one of the pair of inputs, and the final four pulses satisfy gate 58 to provide outputs on line 68 from gate 58. This output signal corresponds to the amount of image reduction required to normalize the image to a predetermined size, as shown in dotted lines on the face of examination device 16. Consequently, the circuit described so far may be thought of as a subtraction or difference circuit where the first five pulses of the time-sequential pulse group conducted on line 48 are subtracted by filling counter 60, and the final four pulses are used to develop a signal on line 68 corresponding thereto. This signal is applied to a stepping motor 70 (or the equivalent) to correspondingly adjust the auto-focusing device 24. There are many ways to do this, but a digital, reversible stepping motor 70 whose output shaft motion is used to adjust device 24; e.g., by rack and pinion 72, shows the principle. By the time that the image has been normalized, the delay at 56 will have expired, either triggering or allowing the reading machine to trigger for its character-identity function. The previously mentioned stops to limit the amount of magnification of an image can be exterior or interior; e.g., stops 25 on the rack.

Now assume that the image of the unknown character is too small; that is, smaller than a height corresponding to five photocells (the height of examination device 16). In this case a digital network is used to provide a signal on line 78 which is fed to stepping motor 70 causing it to adjust the image forming device 24 to enlarge the image to the normalized size. If circuit simplification is desired, it is possible to have the image forming device 24 always return to a position which would form an image which is well above the normalized size so that the network described below would be unnecessary. To increase the versatility, I have shown a network capable of adjusting device 24 in a direction to enlarge the image of the unknown character. This network is composed of a ring counter 80 of five stages (in addition to a "rest" stage). The ring counter 80 is operated when the timing counter 44 reaches its final stage, by the signal on line 50 which actuates a pulse generator 51 providing a burst of five pulses. It must be remembered that at the time of the signal on line 50 (from the last stage of timing counter 44) the time-sequential pulse group (the signal on line 48) will have already passed. If there were only four (or less) modulations in the signal (meaning that the image of the character covered only four (or less) photocells in detector 26) there would be no coincidence at gate 58; but the filling register 60 will have stepped a number of positions corresponding to the number of photocells of device 26 which detected a portion of the image. In our example where the character image requires magnification, let it be assumed that the projected image covered only three of the photocells (any three). In that case there would be only three pulses in the time-sequential pulse group conducted on line 48, and therefore the first three stages of the filling register 60 would be set (storing binary ones). The first four stages of the filling register have conductors 82 connected to the inhibit terminals of a group of inhibit AND gates 84. The other terminals of the inhibit AND gates have conductors 86 connected therewith, the last-mentioned conductros also being connected with stages 1–4 respectively of the ring counter 80. The fifth stage of ring counter 80 has line 88 extending therefrom which is OR gated at 90 with the output lines 92 of the four inhibit gates 84. Output line 94 of OR gate 90 forms an input of an inhibit, coincidence AND gate 96 whose other input is line 64; i.e., from the last stage of the filling register 60. The signal conducting line 78 for the stepping motor 70 is the output line of inhibit gate 96. Line 78 is similar to line 68, except that it is connected to the reversing terminal of motor 70. The summing network made of counter 80, inhibit gates 84, etc., operates as follows: Since the projected image of the unknown character is smaller than the normalized size it must be enlarged an amount to suit the dimensions of examination device 16; i.e., normalized size. Since we previously assumed that the image covered only three photocells of device 26, only three stages of register 30 will store binary ones. This means that the time-sequential pulse group on line 48 will contain three pulses, none of which will satisfy gate 58 (because the input on line 64 will not have been satisfied). However, the filling register 60 will step to set the first three stages thereby providing standing signals to the inhibit terminals of the inhibit gates 84 connected with these three stages. Then the signal on line 50 from timing 12th stage of counter 44 will cycle counter 80. As the counter steps to stages 1, 2 and 3 thereof, the inhibit signals on the three gates 84 associated with these stages will prevent signals from passing on to the OR gate 90. However, there will be no inhibit signal from stage four of filling register 60 so that when the ring counter 80 steps to stage four, there will be an output through the inhibit gate 84 associated therewith, the OR gate 90, line 94, gate 96 and then to the stepping motor by way of line 78. The direction of operation of the stepping motor will be such as to enlarge the image projected from device 24. Finally, when counter 80 steps to the fifth stage, there will be another pulse conducted on line 88, through gate 90, gate 96 and then over line 78 to the stepping motor. Assuming that the stepping motor (70) shaft is rotated through an angle sufficient to enlarge or reduce the image an amount corresponding to the height of one photocell of device 26 for each input pulse, the image projected by device 24 will be normalized to the right size. Shift register 60 is cleared and counter 80 is reset to zero by a signal on line 98 which is fed back from the final stage of counter 80 to the shift register 60 and the counter 80 respectively.

Another possibility in the operation of my invention is that the character which is originally projected by device 24 is already normalized; i.e., it needs no enlargement or reduction. In that event the register 30 will store five binary ones because the image of the character will cover five of the photocells of size detector 26. None of these pulses will pass gate 58 for the reason that more than five pulses in a pulse group are required to satisfy gate 58. By the time that the fifth stage of filling register 60 satisfies one input of gate 58 (due to delay 66) the fifth pulse of this pulse group on line 55 will have already expired. Then, when ring counter 80 is triggered the four inhibit gates will be inhibited by signals on line 82, but the fifth stage will provide a signal through OR gate 90 to the inhibit AND gate 96. But this gate is now inhibited by a signal on line 64 so that this pulse cannot pass. Thus, just as required, when the character image is already of the correct size, my circuit will recognize this and will refrain from adjusting the device 24.

I previously indicated that in some uses of my invention I could lock the optical normalizer after the first character or few characters of a line, or lines of a document are examined, on the assumption that the document will have been printed by the same printer, and therefore all characters would be of a given font. Locking can be accomplished by a counter 91 operated by the reading machine "read" signals on line 54 to provide an inhibit signal on line 93 for all signals from the size detector 26. I have shown gate 95 interposed in lines 1*a*–11*a*, it being understood that inhibit AND gate 95 represents an individual gate in each of these lines. Counter 91 has "*n*" stages since it could have any actual number depending on how many characters are desired in the sample. Counter 91 can be automatically reset, or manually reset by a signal on the switch controlled line 97.

Where it is desired to use the average height of characters of a given sample, several techniques can be adopted. For instance, the number of stages of register 30 set for a sample (e.g., ten characters) can be counted, and then divided by the number of sample characters to produce a quotient signal which is used to adjust the device 24. Then counter 91 and gate 95 would disconnect the normalizer circuits so that the device 24 would retain the adjustment. The circuits for doing the above essentially involve duplication of registers 30 and the gating as is understood by those familiar with computer type circuitry.

FIGURE 3 shows a reading machine with a different type of scanning. Instead of a full field examination device made of a matrix of photocells or instead of other types of conventional scanners, disc 100 can be used with or without a moving spot scanner, for instance as shown in the Rabinow Patent No. 2,933,246. The disc 100 has the image of an unknown character projected thereon by device 24*a*, as the disc rotates. The character defining windows in the disc can be transparent with the characters opaque or vice versa. In either case a photocell 102 is located to one side of the disc, and the image of the unknown character is projected on the opposite side. I have a semi-transparent mirror 104 in the optical path between the character and the face of disc 100 so that one image of the unknown character is projected by device 24a onto disc 100, and another image is projected onto the face of height detector 26a which can be the same as height detector 26. If it is the same, the circuits 104 shown by a box in FIGURE 3, are the same as the circuits shown in FIGURE 2. Signals are fed on output lines 68a and 78a which correspond to lines 68 and 78 respectively. As far as normalizing character size is concerned, the operation of the form of the invention shown in FIGURE 3 is identical to that shown in FIGURE 2.

It was previously indicated that size detector 26 detects the height of the images of unknown characters, and the image forming device 24 uniformly enlarges or reduces image size along $x$ and $y$ axes. It is obvious that I could detect width dimension in place of or in addition to the height dimension of an unknown character to obtain the same results. Furthermore, I can distort the character image optically very easily. Mere substitution of a cylindrical lens in device 24 will reduce the image size in one dimension only. This technique of distorting the character image has several advantages. For instance, I could use a beam splitter in the optical path such as shown in my previously referred to patent or a half reflective mirror as at 104 in FIGURE 3 and concurrently project images which are distorted in different ways (for instance horizontally compressed or enlarged and/or vertically compressed or enlarged) onto a plurality of examination devices 26 and by simple gating (or guard cells as in application Serial No. 115,267) and select the data from the examination device which is correctly filled with a character image, for gating into the reading machine. In the multi-image adaptation of my invention I can achieve another result dealing with the detection of the clear white space between characters. Character separation is an acute problem in reading by machine. Often characters are printed so close together that it is most difficult for a machine to detect the clear white space between characters. By splitting image projected by device 24, one of the images could be distorted by a lens which horizontally enlarges the character and its background. This image could be used with a vertical row of photocells, for example, similar to the detection device 26, in order to seek the now enlarged clear white space between characters. The other image which is uniformly enlarged or reduced by device 24 would be used as shown in FIGURE 2 and for the purpose described; i.e., uniformly normalizing as to size. It is realized that horizontal magnification will also magnify small breaks in the printing of a character, but these breaks are generally not as clean (when magnified) as the breaks between discrete characters, and the differences between the two can be ascertained because of this.

The preceding description of various forms of my invention is given by way of example only, and this is particularly true of the number of photocells, stages of the registers, etc. My circuits, and even motor 70, are digital. For almost all digital circuits corresponding analog circuits to accomplish the same result can be constructed. As specifically applied here, I need not count the number of photocells of device 26 which see a part of the character image—this being the effect of register 30. I could develop analog voltages by using conventional adders (for instance resistor matrices) and develop servo correction signals of a negative or positive sense to operate a reversible motor in a manner which could correspond to the magnitude and direction of signals obtained from the resistive adders. There are many other variations of my invention. Therefore, all variations falling within the scope of the following claims may be resorted to.

I claim:

1. A size-normalizing apparatus for a character reading machine having a character examination device, said apparatus comprising means to form an image of an unknown character for examination by said device, a dimension detector to detect a dimension of said image of the character itself and to provide a signal which corresponds to the dimension of said image with respect to a predetermined reference-dimension, and means responsive to said signal for altering the size of said image to conform to said reference-dimension.

2. Apparatus to increase the capacity of a single font reading machine to identify characters of a larger number of fonts, said apparatus comprising image forming means for an unknown character, image-size detecting means for detecting the size of the unknown character itself and for providing a signal which is a function of said unknown character image size, and means responsive to said signal to change the size of said image for conforming to a predetermined size compatible with the reading machine.

3. The apparatus of claim 2 wherein said size-changing means selectively enlarges or reduces said image for said conforming.

4. In combination with a reading machine which identifies characters after examination of the images thereof, the improvement comprising an optical normalizer for the size of said images to enlarge the operation capability of said reading machine to include a variety of character size variations, said normalizer including an adjustable image-forming means which forms imges of the characters to be identified, and means responsive to the size of as said image of a character itself for adjusting said adjustable means to change the size of said image to a predetermined size.

5. In a character identifying machine where a portion of the identifying procedure includes the examination of the image of a character; image forming means for the unknown character, means to detect the size of the image of said unknown character itself and provide a signal which indicates whether said image must be enlarged or reduced to be a predetermined size, and means responsive to said signal to adjust the size of said image.

6. The subject matter of claim 5 wherein said image forming means include an automatically focusing optical device.

7. In a reading machine for characters of different sizes, where the machine has a device to examine the images of the characters, optical means to normalize the characters to a predetermined size to facilitate examination by said device, said optical means including an adjustable image-forming means, and means responsive to an image of a character itself formed by said image-forming means to adjust the same to change the size of said image to conform to said predetermined size.

8. The subject matter of claim 7 wherein said image forming means include an optical device capable of enlarging and reducing an image projected therefrom, and said adjusting means including means to detect the size of an image of the character and provide an output signal indicating the size of the image with respect to said predetermined size, and means operated in response to said signal to correspondingly adjust said optical device.

9. The subject matter of claim 8 wherein the last-mentioned means include difference circuits to selectively adjust said optical device so as to increase or decrease the size of said image.

10. An optical, size-normalizing apparatus for a character reading machine to enlarge the capacity of a reading machine to identify characters of different sizes, said apparatus comprising adjustable means to form an image of an unknown character, means to examine said image of said unknown character for its size and to provide a signal which is a function of image size, means establishing a reference for the derived character-size, means for comparing said signal with said reference and for providing a new signal which corresponds to the difference between said signal and said reference, and means responsive to said new signal for adjusting said adjustable means to the extent necessary to normalize said image.

11. The apparatus of claim 10 wherein the characters to be identified are on a document, and means operatively connected with said examining means for disabling said examining means after examination of a predetermined number of characters on the document.

12. The subject matter of claim 4 and means associated with said normalizer to render said normalizer insensitive to adjustment after a predetermined number of possible adjustments.

References Cited by the Examiner

UNITED STATES PATENTS 2,747456 5/56 Waller et al. ------------ 88—17

MALCOLM A. MORRISON, *Primary Examiner.*